US012735309B2

(12) United States Patent
Peteri et al.

(10) Patent No.: US 12,735,309 B2
(45) Date of Patent: Sep. 15, 2026

(54) WATER SUPPLY DEVICE

(71) Applicant: Quooker International B.V., Ridderkerk (NL)

(72) Inventors: Niels Theodoor Peteri, Rotterdam (NL); Jan Oosting, Ridderkerk (NL); Laurens Gillis Jacobus De Rijke, Dordrecht (NL)

(73) Assignee: Quooker International B.V., Ridderkerk (NL)

( * ) Notice: Subject to any disclaimer, the term of this patent is extended or adjusted under 35 U.S.C. 154(b) by 123 days.

(21) Appl. No.: 18/708,308

(22) PCT Filed: Dec. 2, 2022

(86) PCT No.: PCT/NL2022/050698
§ 371 (c)(1),
(2) Date: May 8, 2024

(87) PCT Pub. No.: WO2023/101557
PCT Pub. Date: Jun. 8, 2023

(65) Prior Publication Data
US 2025/0011150 A1 Jan. 9, 2025

(30) Foreign Application Priority Data
Dec. 3, 2021 (NL) ..................................... 2030010

(51) Int. Cl.
*B67D 1/00* (2006.01)
*B67D 1/12* (2006.01)

(52) U.S. Cl.
CPC ......... *B67D 1/0014* (2013.01); *B67D 1/1277* (2013.01); *B67D 2210/00013* (2013.01); *B67D 2210/00118* (2013.01)

(58) Field of Classification Search
CPC ................ B67D 1/0014; B67D 1/1277; B67D 2210/00013; B67D 2210/00118
See application file for complete search history.

(56) References Cited

U.S. PATENT DOCUMENTS 10,202,269 B2 * 2/2019 Forte .................... B67D 1/0009
2016/0023880 A1 1/2016 Forte et al.

FOREIGN PATENT DOCUMENTS

DE 196 18 319 A1 11/1997
DE 102017203112 A1 * 8/2018 ............ E03C 1/0411
(Continued)

OTHER PUBLICATIONS

Machine Translation of DE-102017203112-A1.*
Machine translation of JP-2000274818-A.*
Machine Translation of JP-2015130824-A.*

*Primary Examiner* — Jeremy Carroll
(74) *Attorney, Agent, or Firm* — Hoffmann & Baron, LLP

(57) ABSTRACT

A water supply device for supplying water for consumption includes a hot-water tank and a pipeline for conveying water with a temperature below 65° C. to a draw-off point. The water supply device further includes an inlet valve configured for allowing or blocking inflow of fresh water into the hot-water tank feed, a return pipe that connects the line for conveying water with a temperature below 65° C. to the hot-water tank for returning water, and a return pipe valve fitted in the return pipe to allow or to block flow of water through the return pipe, in such a way that by blocking the inlet valve and opening the return pipe valve, a circulation circuit is formed for the at least partial sterilization of the line for conveying water with a temperature below 65° C.

23 Claims, 5 Drawing Sheets

(56) References Cited

FOREIGN PATENT DOCUMENTS

| | | | | |
|---|---|---|---|---|
| JP | 2000274818 | A | * | 10/2000 |
| JP | 2015130824 | A | * | 7/2015 |

* cited by examiner

WATER SUPPLY DEVICE

CROSS-REFERENCE TO RELATED APPLICATIONS

This application is the National Stage of International Application No. PCT/NL2022/050698, filed Dec. 2, 2022, which claims the benefit of Netherlands Application No. 2030010, filed Dec. 3, 2021, the contents of which is incorporated by reference herein.

FIELD OF THE INVENTION

The invention relates to a water supply device for supplying water for consumption.

BACKGROUND OF THE INVENTION

Various water supply devices are known that are arranged for supplying water for consumption. It is desirable that said water is supplied via pipelines that are free from bacteria.

The bacteria may already be present in the various pipelines at the time of commissioning or may get into the pipeline via fresh water that is supplied from a general water supply system. It is also possible that bacteria get into the water main from a supply point for supplying water, for example a tap placed in a kitchen.

DE102017203112A1 discloses a domestic device with a system for supplying cooled water. The device comprises a hot-water system that can be operated in a disinfection mode for supplying hot water that is used for at least partial disinfection of the system for supplying cooled water. In this disinfection mode the hot water is led to a discharge from the hot-water system via at least a part of the system for supplying cooled water.

US2016/0023880A1 and DE19618319A1 disclose other devices for supplying water for consumption, in which a disinfection system is provided for the at least partial disinfection of pipelines.

SUMMARY OF THE INVENTION

An aim of the invention is to provide a water supply device for supplying water for consumption, wherein the water may have a temperature below 65° C., and wherein the chance of the presence of bacteria in the line for conveying water with a temperature below 65° C. is or can be made to be considerably lower.

For this purpose, the invention provides the water supply device as described herein below.

The water supply device according to the invention comprises a hot-water tank arranged for keeping hot water at a temperature of at least 90° C. A hot-water tank of this kind is known for supplying water for consumption. The hot-water tank is for example used for supplying hot water, for example boiling water with a temperature of 100° C. as it leaves the tap.

The hot water may also be used for mixing with cold water in order to supply warm water. This prevents warm water, of for example 40° C., being held for a rather long time in a tank at this temperature, which is harmful because it is precisely at such a temperature that bacteria can grow well.

It is possible to cool the water from the hot-water tank in order to supply it as cooled water. This water may be supplied directly after cooling or may first be stored in a cold-water tank.

In both cases use is made of water at above 90° C., for example at 105° C. or more, which is cooled by cooling or mixing in a line for conveying water with a temperature below 65° C.

The water supply device has for example a stand-by mode in which no water is supplied through the line for conveying water with a temperature below 65° C. and a draw-off mode for example for cooled water, cooled-down water or mixing water that has come at least partially from the hot-water tank with a temperature below 65° C. and is supplied through the line for conveying water with a temperature below 65° C.

According to the invention, the water supply device comprises an inlet valve that is configured for allowing or blocking inflow of fresh water into the hot-water tank feed, a return pipe that connects the line for conveying water with a temperature below 65° C. to the hot-water tank feed for returning water from the line for conveying water with a temperature below 65° C. to the hot-water tank, and a return pipe valve fitted in the return pipe to allow or to block flow of water through the return pipe.

This configuration makes it possible, in a sterilization mode, to form a circulation circuit by blocking the inlet valve and opening the return pipe valve. A pump is provided in the circulation circuit for pumping water round through the circulation circuit. By this means it is possible for water that is supplied from the hot-water tank into the line for, at least in a draw-off mode, conveying water with a temperature below 65° C. to be returned via the return pipe to the hot-water tank for the at least partial sterilization of the line for conveying water with a temperature below 65° C.

An advantage of sterilization with a circulation circuit for the pipeline for water with a temperature below 65° C. is that it is not necessary to dispense the hot water that is used for sterilization as hot or boiling water or as steam via a tap or similar, but it can instead remain in the circulation circuit during the sterilization mode.

In an embodiment, the water supply device comprises a cooling device for cooling the hot water from the hot-water tank to water with a temperature below 65° C. and/or a mixing device for mixing the hot water from the hot-water tank with cold water to provide water with a temperature below 65° C.

By cooling or mixing, the water from the hot-water tank can be cooled down to a temperature below 65 degrees, so that the line for conveying water with a temperature below 65° C. is used in the draw-off mode for conveying water with a temperature below 65° C.

In an embodiment the water supply device comprises:

- a cold-water tank arranged for keeping cooled water at a temperature of at most 20° C., comprising:
- a cold-water tank feed connected to the hot-water tank discharge for supplying water from the hot-water tank to the cold-water tank,
- a cold-water tank discharge for supplying cooled water from the cold-water tank into the line for conveying water with a temperature below 65° C.

In this embodiment, the hot water from the hot-water tank is fed to a cold-water tank where the water is cooled to and/or is kept at a temperature of at most 20° C.

The cold-water tank may comprise a cooling device for keeping the cooled water at a desired temperature. The cooling device may be any suitable device for cooling down the cooled water and/or keeping it at the desired temperature.

The cooled water may then be dispensed as cooled water via a tap. The cold-water tank and/or the associated pipelines may form part of the circulation circuit with which these pipelines can be sterilized.

In an embodiment the water supply device comprises:

a heat exchanger comprising:

a first heat exchange line with a first inlet and a first outlet, and a second heat exchange line with a second inlet and a second outlet, wherein the first heat exchange line and the second heat exchange line are arranged to exchange heat with each other.

Herein, the first inlet may be connected to the hot-water tank discharge and the first outlet may be connected to the cold-water tank feed, and the second inlet is to be connected to a fresh water main and the second outlet is connected to the hot-water tank feed.

The cooled-down water may be fed to the cold-water tank. This has the advantage that the heat of the hot water that is then cooled down in the cold-water tank is not lost completely but is transferred in the heat exchanger to the fresh water that is led to the hot-water tank feed. The water cooled-down by the heat exchanger is for example tepid water with a temperature between 20° C. and 30° C., and may then be cooled down further in the cold-water tank to the desired temperature and kept at this temperature.

In an embodiment, the first inlet is connected to the hot-water tank discharge and the first outlet is connected to the line for supplying, at least in the draw-off mode, water with a temperature below 65° C., and the second inlet is to be connected to a fresh water main and the second outlet is connected to the hot-water tank feed.

In this embodiment, the hot water from the hot-water tank is cooled down by means of a heat exchanger to cooled-down water and is fed to the line for conveying water with a temperature below 65° C.

In an alternative embodiment, the first outlet of the heat exchanger is connected via the line for conveying water with a temperature below 65° C. directly and/or via a mixing device to a tap where cooled-down water may be supplied as cooled-down water for consumption. Moreover, the cooled-down water may be mixed in a mixing device with hot water received from the hot-water tank to supply mixing water, and hot water may be supplied directly from the hot-water tank as hot or boiling water. In a water supply device of this kind, all the water to be supplied, such as cooled-down water, mixing water and hot or boiling water, comes from the hot-water tank. This has the advantage that all of the water is kept above a temperature of at least 90 degrees until it is supplied, which promotes the killing of bacteria in this pipeline.

The heat exchanger is for example a plate heat exchanger. A plate heat exchanger is a heat exchanger that makes use of heat exchange by means of a number of plates stacked on top of one another with passages provided therein for forming the first and the second heat exchange line. A plate heat exchanger of this kind can be used effectively for heat exchange. With a heat exchanger of this kind it is possible to transfer a large part of the heat of the hot water to the fresh water, while the hot water becomes available as cooled-down water for supply via a line for conveying water with a temperature below 65° C. or may be cooled further in a cold-water tank.

In an embodiment, the water supply device comprises a control device for controlling at least the inlet valve, the return pipe valve and the pump, wherein the control device is arranged for operating the water supply device in various operating modes, wherein the operating modes comprise a sterilization mode, in which the inlet valve is placed in a closed state, the return pipe valve is placed in an open state and the pump is activated, in such a way that water is pumped through the circulation circuit for the at least partial sterilization of the line for conveying water with a temperature below 65° C.

By means of the control device, sterilization of the line for conveying water with a temperature below 65° C. may be carried out as desired, for example on commissioning the device, or periodically and/or on request.

In an embodiment, the water supply device comprises a draw-off valve, to be controlled by the control device, which is arranged to allow or to block outflow of water, for example water with a temperature below 65° C., from the line for conveying water with a temperature below 65° C. to the draw-off point, wherein in the sterilization mode the draw-off valve is placed in a closed state to block outflow of water from the line for conveying water with a temperature below 65° C. to the draw-off point.

In order to prevent, during a sterilization mode, accidental opening of the tap for supplying water from the line for conveying water with a temperature below 65° C., and consequently supplying circulating hot water from the draw-off point, advantageously a draw-off valve to be controlled by the control device may be provided, which may be blocked by the control device during the sterilization mode. This may be the draw-off valve that is also used for supplying the water from the draw-off point during the draw-off mode, but also a draw-off valve specially provided for this purpose.

In an embodiment, the operating modes to be controlled by the control device further comprise:

a stand-by mode, in which the draw-off valve and the return pipe valve are placed in a closed state, and the draw-off mode, in which the return pipe valve is placed in a closed state and the draw-off valve is placed in an open state to allow outflow of water with a temperature below 65° C. from the line for conveying water with a temperature below 65° C. to the draw-off point and in which the inlet valve is placed in an open state to allow inflow of fresh water into the hot-water tank through the hot-water tank feed.

In an embodiment, the hot-water tank comprises a second hot-water tank discharge for supplying hot or boiling water, wherein the water supply device comprises a second draw-off valve that is arranged to allow or to block outflow of hot water from the second hot-water tank discharge, wherein the control device is further arranged to control a draw-off mode for hot or boiling water, in which the return pipe valve is placed in a closed state and the second draw-off valve is placed in an open state to allow outflow of hot water from the hot-water tank through the second hot-water tank discharge and in which the inlet valve is placed in an open state to allow inflow of fresh water into the hot-water tank through the hot-water tank feed.

In this embodiment, in the sterilization mode the second draw-off valve can be placed in a closed state to block outflow of water with a temperature of hot water from the hot-water tank through the second hot-water tank discharge. The first and the second draw-off valve may be formed by a single valve or by two different valves.

In an embodiment, the cold-water tank comprises a first compartment for keeping cooled water at a temperature of at most 20° C. and a second compartment arranged for keeping cooled carbonated water at a temperature of at most 20° C., wherein the first compartment is connected to the cold-water tank feed and the cold-water tank discharge, wherein the second compartment is connected to a second cold-water tank feed and a second cold-water tank discharge, wherein the second cold-water tank feed is connected to the hot-water tank discharge for supplying water from the hot-water tank to the second compartment, and the second cold-water tank discharge is provided for supplying cooled carbonated water from the second compartment via a further line, wherein the water supply device further comprises a $CO_2$ holder for supplying $CO_2$, wherein the second compartment is arranged to dissolve $CO_2$ provided by the $CO_2$ holder in the cooled water held in the second compartment. A second pump may be provided for supplying carbonated water. It is also possible to use the pump for circulating water through the circulation circuit, for supplying cooled carbonated water from the second compartment.

In an embodiment, the cold-water tank discharge is arranged for supplying cooled water from the cold-water tank, and the cold-water tank comprises a second cold-water tank discharge for supplying carbonated cooled water. With this embodiment it is possible to use the cold-water tank to supply both cooled water and carbonated cooled water. For this purpose the cold-water tank may have a first compartment for holding cooled water in which no $CO_2$ has been dissolved and a second compartment for holding carbonated cooled water, wherein the $CO_2$ holder is connected to the second compartment for dissolving $CO_2$ in the cooled water.

The second compartment may be fitted at least partially in or around the first compartment. In another embodiment, besides the cold-water tank, a second tank may be provided for cooled water in which, by means of a $CO_2$ holder, $CO_2$ is dissolved therein for supplying cooled carbonated water.

In an embodiment, the water supply device comprises a filter for filtering the hot water, wherein the filter is fitted in the hot-water tank or in the hot-water tank discharge, in such a way that the hot water discharged by the hot-water tank discharge is filtered by the filter.

By fitting the filter for filtering the water used for consumption in the hot-water tank or the hot-water tank discharge, owing to the high temperature of the water of at least 90° C. there will be no growth or almost no growth of bacteria in the filter.

In an embodiment, the filter is an activated carbon filter. An activated carbon filter may be used for removing aromatic substances and flavourings from water that is used as water for consumption. In particular, an activated carbon filter is sensitive to bacterial growth. It is therefore advantageous to fit an activated carbon filter in the hot-water tank where because of the high temperature the carbon filter will be subject to no or very little bacterial growth.

In an embodiment, the filter is fitted in or near the hot-water tank discharge in order to filter hot water that is supplied by the hot-water tank discharge. By providing the filter in or near the hot-water tank discharge, the hot water is only filtered as it leaves the hot-water tank. Here, the hot water in the hot-water tank will have the desired temperature of at least 100° C. for the longest time and will not or will barely contaminate the filter with bacteria. The line for conveying water with a temperature below 65° C., for example the cold-water tank, will in consequence only be supplied with filtered water. It is therefore no longer necessary to provide a filter in the cold-water tank in order to supply cooled filtered water for consumption. When the filter is for example placed near the hot-water tank feed, cooler water will regularly flow through the filter, so that the chance of bacterial growth or the like in the filter is greater.

The invention further provides a method for sterilizing a pipeline that is used in a draw-off mode for conveying water with a temperature below 65° C. to a draw-off point and that is in fluid communication with a hot-water tank discharge of a hot-water tank of a water supply device, wherein the hot-water tank is arranged for keeping hot water at a temperature of at least 90° C. and comprises a hot-water tank feed for supplying fresh water to the hot-water tank, wherein the water with a temperature below 65° C. to be supplied in the draw-off mode comes at least partially from the hot-water tank, wherein an inlet valve is provided that is arranged to allow or to block inflow of fresh water into the hot-water tank feed, and a draw-off valve that is arranged to allow or to block outflow of water with a temperature below 65° C. from the line for conveying water with a temperature below 65° C. to the draw-off point, wherein a return pipe is provided that connects the line for conveying water with a temperature below 65° C. to the hot-water tank for returning water from the line for conveying water with a temperature below 65° C. to the hot-water tank, and wherein a return pipe valve is fitted in the return pipe to allow or to block flow of water through the return pipe, wherein the method comprises the at least partial sterilization of the line for conveying water with a temperature below 65° C., comprising the steps:

forming a circulation circuit by blocking the inlet valve and opening the return pipe valve, and pumping water round in the circulation circuit, wherein water that is supplied from the hot-water tank into the line for conveying water with a temperature below 65° C. is returned via the return pipe to the hot-water tank.

In an embodiment, the water with a temperature below 65° C. to be supplied in the draw-off mode is hot water from the hot-water tank that is cooled down to water with a temperature below 65° C.

In an embodiment, the water with a temperature below 65° C. to be supplied in the draw-off mode is hot water from the hot-water tank mixed with cold water to provide water with a temperature below 65° C.

In an embodiment of the method, wherein the water supply device comprises a control device for controlling at least the inlet valve, the return pipe valve and the pump, the method comprises controlling, with the control device, the water supply device in various operating modes, wherein the operating modes comprise:

a sterilization mode, in which the inlet valve and the draw-off valve are placed in a closed state, the return pipe valve is placed in an open state and the pump is activated in the circulation circuit to allow flow of water through the return pipe, in such a way that water is pumped through the circulation circuit for the at least partial sterilization of the line for conveying water with a temperature below 65° C., wherein the method comprises selecting the sterilization mode for the control device.

In an embodiment, the operating modes to be controlled by the control device further comprise:

a stand-by mode, in which the draw-off valve and the return pipe valve are placed in a closed state, and a draw-off mode, in which the return pipe valve is placed in a closed state and the draw-off valve is placed in an open state to allow outflow of water with a temperature below 65° C. from the line for conveying water with a temperature below 65° C. to the draw-off point and in which the inlet valve is placed in an open state to allow inflow of fresh water into the hot-water tank through the hot-water tank feed.

In an embodiment of the method, the water supply device comprises:

a heat exchanger comprising:

a first heat exchange line with a first inlet and a first outlet, and a second heat exchange line with a second inlet and a second outlet, wherein the first heat exchange line and the second heat exchange line are arranged to exchange heat with each other, wherein the first inlet is connected to the hot-water tank discharge and the first outlet is connected to the line for conveying water with a temperature below 65° C., and wherein the second inlet is connected to a fresh water main and the second outlet is connected to the hot-water tank feed, wherein the method comprises supplying hot water from the hot-water tank via the first heat exchange line to the line for conveying water with a temperature below 65° C.

In this embodiment, the line for conveying water with a temperature below 65° C. may be connected to a tap, to be supplied as cooled-down water for consumption.

In an embodiment of the method, the water supply device comprises:

a cold-water tank arranged for keeping cooled water at a temperature of at most 20° C., comprising:

a cold-water tank feed for supplying water to the cold-water tank, a cold-water tank discharge for dispensing cooled water from the cold-water tank, a heat exchanger comprising:

a first heat exchange line with a first inlet and a first outlet, and a second heat exchange line with a second inlet and a second outlet, wherein the first heat exchange line and the second heat exchange line are arranged to exchange heat with each other, wherein the first inlet is connected to the hot-water tank discharge and the first outlet is connected to the cold-water tank feed, and wherein the second inlet is to be connected to a fresh water main and the second outlet is connected to the hot-water tank feed, wherein the method comprises supplying, during the draw-off mode, the hot water from the hot-water tank via the first heat exchange line to the cold-water tank, then to be supplied as cooled-down water for consumption.

In an embodiment, the cold-water tank comprises a first compartment for keeping cooled water at a temperature of at most 20° C. and a second compartment arranged for keeping cooled carbonated water at a temperature of at most 20° C., wherein the first compartment is connected to the cold-water tank feed and the cold-water tank discharge, wherein the second compartment is connected to a second cold-water tank feed and a second cold-water tank discharge, wherein the second cold-water tank feed is connected to the hot-water tank discharge for supplying water from the hot-water tank to the second compartment, and the second cold-water tank discharge is provided for supplying cooled carbonated water from the second compartment via a further line, wherein the water supply device further comprises a $CO_2$ holder for supplying $CO_2$, wherein the second compartment is arranged to dissolve the $CO_2$ provided by the $CO_2$ holder in the cooled water held in the second compartment, and wherein the method comprises supplying, during the draw-off mode, the hot water from the hot-water tank via the first heat exchange line to the second compartment, then to be supplied as cooled carbonated water.

It is to be noted that various types of water are mentioned in this patent application. These are:

hot water, water with a temperature of at least 65° C., for example at least 95° C.; at a temperature of at least 100° C., also called boiling water;

warm water, water with a temperature in the range from 35° C. to 65° C.;

fresh water, water that is supplied by a water main from the central water supply system or another fresh water source;

tepid water, water with a temperature of 20° C. to 35° C.;

cooled-down water, water that has come from the hot-water tank and has cooled down, for example by mixing and/or cooling to a temperature of at most 65° C., for example at most 35° C.;

cooled water, water that has cooled in the cold-water tank to a temperature of at most 20° C., for example at most 10° C.;

carbonated cooled water, cooled water in which carbon dioxide ($CO_2$) has been dissolved under pressure; and filtered water, water that has been filtered with a filter, for example (carbonated) cooled filtered water.

BRIEF DESCRIPTION OF THE DRAWINGS

Embodiments of a water supply device according to the invention will be described in more detail hereunder, referring to the figures, in which.

DETAILED DESCRIPTION OF THE INVENTION

Figure 1:
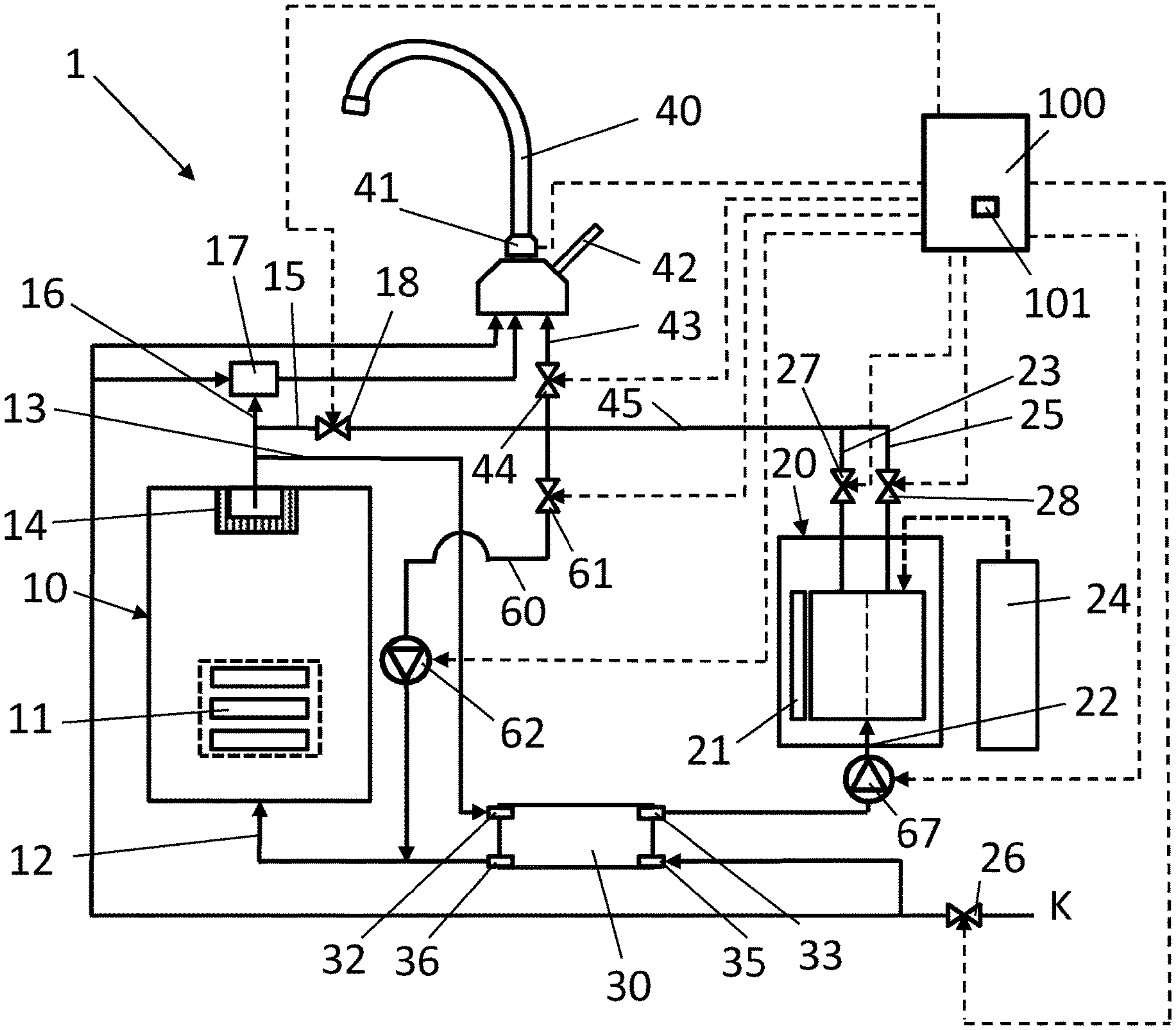
FIG. 1 shows schematically a first embodiment of a water supply device according to the invention.

FIG. 1 shows an embodiment of a water supply device for at least supplying cooled filtered water for consumption. The water supply device is indicated in general with reference number 1. The water supply device 1 comprises a hot-water tank 10, a cold-water tank 20, a heat exchanger 30, and a tap 40.

The hot-water tank 10 is arranged for keeping hot water at a temperature of for example 108° C. A heating device 11 with temperature control is fitted in the hot-water tank 10 to heat up water in the hot-water tank 10 to the desired temperature and keep it at this temperature. The hot-water tank 10 comprises a hot-water tank feed 12 for supplying fresh water to the hot-water tank 10 and a hot-water tank discharge 13 for discharge of hot water from the hot-water tank 10. In the hot-water tank 10, near the start of the hot-water tank discharge 13, a filter 14 is fitted for filtering the hot water that is discharged through the hot-water tank discharge 13. The filter 14 is an activated carbon filter that is arranged to adsorb certain constituents from water by means of activated carbon. The filter 14 is fitted in the hot-water tank 10 because the temperature of the hot water is relatively high. Owing to this high temperature, the filter 14 will remain free from bacterial growth. Especially for water for consumption, it is desirable that no bacteria are present in the water.

The hot-water tank 10 comprises a second hot-water tank discharge 15 and a third hot-water tank discharge 16. The first hot-water tank discharge 13, the second hot-water tank discharge 15 and the third hot-water tank discharge 16 may be provided as three separate channels from the hot-water tank 10 or as a combined channel from the hot-water tank 10 that is split into the separate discharges as shown in FIG. 1.

The second hot-water tank discharge 15 is connected directly to the tap 40 for supplying hot water. A control button 41 is provided for activating the supply of the hot water. The hot water will, on flowing from the hot-water tank 10, go through the filter 14 and therefore will be supplied as filtered hot water that is suitable for consumption. In the hot-water tank 10, the water pressure is above atmospheric as a result of the pressure of the water from a water supply system K with which fresh water is supplied, and because the water expands during heating of the water by the heat supplied from heating device 11. Because of the overpressure, the hot water of for example 108° C. in the hot-water tank 10 will not boil. On opening the tap 40, the pressure of the hot water will decrease to atmospheric pressure. As a result, the hot water will be boiling as it leaves the tap. In this embodiment the hot water is thus supplied as boiling water.

The control button 41 is arranged to supply an electrical signal to control device 100, which may be used for controlling one or more valves. In an alternative embodiment the control button 41 may be arranged to operate a mechanical valve.

The third hot-water tank discharge 16 is connected to a mixing device 17 for mixing, in a certain mixing ratio, the hot water from the hot-water tank 10 with fresh water from a water supply system K in order to supply warm water. This warm water is then fed to the tap 40. In the tap 40, a second mixing device (not shown) is provided, which is to be operated by means of control element 42. The second mixing device is arranged for mixing, with a mixing ratio to be set manually with control element 42, fresh water from the water supply system K with the warm water, to supply mixed water from the tap 40 in the temperature range between the temperature of the fresh water and the temperature of the warm water.

The cold-water tank 20 is arranged for keeping cooled water at a temperature of at most 20° C., for example 10° C. or lower. A cooling device 21 with temperature control is fitted in the cold-water tank 20 for cooling down the water in the cold-water tank 20 to the desired temperature and keeping it at this temperature. The cold-water tank 20 comprises a cold-water tank feed 22 for supplying water to the cold-water tank 20 and a cold-water tank discharge 23 for discharge of cooled water from the cold-water tank 20.

The water supply device 1 comprises a $CO_2$ holder 24 for supplying $CO_2$ under pressure. The cold-water tank 20 is also arranged for dissolving $CO_2$ in the cooled water that is held in the cold-water tank 20. For this purpose, the cold-water tank 20 may comprise two compartments, one for cooled or cooled and filtered water and another for carbonated cooled or cooled and filtered water, as shown schematically by the dotted line in the cold-water tank. In order to dissolve $CO_2$ in the cooled water, a pressure is required that is generally higher than the water pressure supplied by the water supply system K. The cold-water tank 20 may comprise a pump 67 to allow water to flow through the cold-water tank feed 22 into the second compartment of cold-water tank 20 against the higher pressure of the $CO_2$ from the $CO_2$ holder 24. This pump thus supplies a water pressure that is higher than the pressure that is applied by the $CO_2$ holder 24 in the cold-water tank 20.

By dissolving carbon dioxide in the cooled water, the cooled water can be supplied as carbonated cooled water for consumption. The cold-water tank 20 comprises a second cold-water tank discharge 25 for discharging carbonated cooled water. The cold-water tank discharge 23 and the second cold-water tank discharge 25 are connected to the tap 40, which has a control button 41, with which the supply of cooled water can be activated. The cold-water tank 20 may be arranged to supply carbonated cooled water or cooled water in which no carbon dioxide has been dissolved, as desired, depending on the operation of the control button 41.

In the cold-water tank discharge 23 and the second cold-water tank discharge 25, a first outlet valve 27 and a second outlet valve 28 are provided for discharging cooled water and carbonated cooled water, respectively. Said first outlet valve 27 and second outlet valve 28 can thus be controlled via the control device 100 with the control button 41.

One and the same supply channel 43 is used for supplying the hot water and the cooled water. The same control button 41 can also be used for controlling, by the control device 100, the supply of either boiling water or cooled water, depending on the operation of the control button 41.

In the supply channel 43, a draw-off valve 44 to be controlled by the control device 100 is fitted, which may be placed in an open state during supply of hot water from the hot-water tank 10 or supply of cooled water from the cold-water tank discharge 23 or 25, and a closed state, when no water is supplied through the supply channel 43. This draw-off valve 44 can prevent bacteria moving from the tap 40 to the cold-water tank discharge 23 and 25. Placement of the draw-off valve 44 in the common supply channel 43 offers the further advantage that this draw-off valve 44 and the downstream part of the supply channel 43 relative to the draw-off valve 44 are flushed during supply of hot water with hot water with which bacteria present in the supply channel 43 are killed.

The draw-off valve 44 may be any suitable valve that can be placed in an open state and a closed state. The draw-off valve 44 in FIG. 1 is an actively operating valve, for example a magnetic valve.

In alternative embodiments, various supply channels and/or various control buttons may be used for supplying hot water, cooled water and/or cooled carbonated water. It is also possible to provide separate taps, for example a separate tap for mixed water and a separate tap for hot water and a separate tap for cooled water.

The heat exchanger 30 is a plate heat exchanger. A longitudinal section of this heat exchanger 30 is shown schematically in FIG. 2. The heat exchanger 30 comprises a first heat exchange line 31 with a first inlet 32 and a first outlet 33 and a second heat exchange line 34 with a second inlet 35 and a second outlet 36. The first heat exchange line 31 and the second heat exchange line 34 are arranged to exchange heat with each other via walls 37 that are placed between the first heat exchange line 31 and the second heat exchange line 34. Stacked plates (not shown) may further be provided for dividing up the two heat exchange lines 31, 34 into a stack of flat parallel sub-lines. The walls 37 and the partitioning of the heat exchange lines 31 and 34 by the stacked plates together ensure efficient heat transfer between the first and the second heat exchange line.

As shown in FIG. 1, the first inlet 32 of the heat exchanger 30 is connected to the hot-water tank discharge 13 and the first outlet 33 is connected to the cold-water tank feed 22, so that cooled-down hot water from the hot-water tank 10 can be fed via the heat exchanger 30 to the cold-water tank 20.

The second inlet 35 of the heat exchanger 30 is connected to a water supply system K, with which fresh water can be supplied. The second inlet 35 may also be connected to any other suitable source for supplying fresh water, for example a fresh water tank. The second outlet 36 is connected to the hot-water tank feed 12.

The internal volume of the heat exchanger 30 may have a small volume relative to the volume of the cold-water tank 20. The internal volume of the heat exchanger 30 is for example at most 20% of the internal volume of the cold-water tank 20, such as at most 10% of the internal volume of the cold-water tank 20.

When the supply of cooled water is activated by operating the control button 41 of the tap 40, cooled water will be supplied from the cold-water tank 20 by opening the outlet valve 27 or outlet valve 28. The outlet valves 27, 28 are to be controlled by control device 100. Owing to the cold water flowing out of the cold-water tank 20, the water pressure in the cold-water tank 20 will decrease. As a result, hot water will flow from the hot-water tank 10 through the first hot-water tank discharge 13 via the first heat exchange line 31 of the heat exchanger 30 and the cold-water tank feed 22 to the cold-water tank 20 to replace the supplied cooled water. At the same time, the hot water flowing away from the hot-water tank 10 will be replaced by fresh water that will flow via the second heat exchange line 34 from the water supply system K to the hot-water tank feed 12 of the hot-water tank 10.

The cooled water that is supplied from the cold-water tank 20 is thus derived from the hot-water tank 10. As this water flows from the hot-water tank 10 to the cold-water tank 20, the water will go through the filter 14 and thus be filtered. The cooled water supplied from the tap 40 is therefore filtered water that is suitable for consumption. Moreover, it is advantageous that filter 14 is placed in the hot-water tank 10, so that the filter 14 will not or will hardly be subject to bacterial growth.

Because the fresh water and the hot water flow in opposite directions through the heat exchanger 30, the heat of the hot water in the first heat exchange line 31 will be transferred effectively to the fresh water in the second heat exchange line 34. The temperature of the hot water will thus decrease in the heat exchanger 30 and the temperature of the fresh water will increase. This means that in the hot-water tank 10 a limited amount of energy is required to heat up the fresh water to the desired temperature of for example 108° C., whereas in the cold-water tank 20 also a limited amount of extra energy is required in comparison with direct cooling of fresh tap water for further cooling of the cooled-down hot water in the heat exchanger to the desired temperature of the cold water of for example 10° C. or lower.

Figure 2:
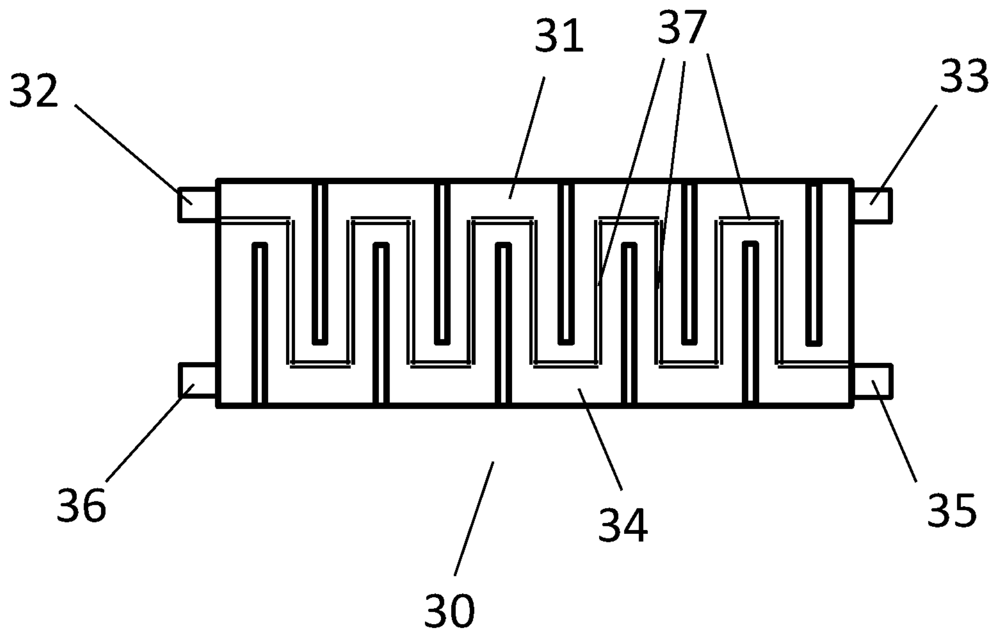
FIG. 2 shows schematically a longitudinal section of a plate exchanger that may be used in the embodiment in FIG. 1.

In a plate heat exchanger as shown schematically in FIG. 2, it is possible for example to cool down the hot water from 108° C. to 22° C.-30° C., whereas the fresh water with a temperature of for example 15° C. can be heated to for example 80° C.-100° C.

In the embodiment in FIG. 1, an inlet valve 26 to be controlled by the control device 100 is provided in the supply line of the fresh water, i.e. between the water supply system K and the hot-water tank 10. In the embodiment shown, the inlet valve 26 is placed in the pipeline from the water supply system K to the second inlet 35 of the heat exchanger 30. As an alternative, the inlet valve 26 may also be placed in the hot-water tank feed 12 of the hot-water tank 10.

The inlet valve 26 may be placed in an open state and a closed state. During normal use of the water supply device 1, the inlet valve 26 will be placed in the open state, in such a way that water that is supplied via the tap 40 is supplemented with water from the water supply system K. The water pressure of the water supply system K is thus used for supplying water, unless the water that is supplied from the cold-water tank 20 is carbonated water. When supplying carbonated water, use is made of a pump 67 that delivers a higher water pressure than the back pressure of the carbon dioxide coming from the $CO_2$ holder 24 that is connected to the holder for carbonated cooled water of cold-water tank 20. This pump 67 for supplying carbonated water may also be placed in cold-water tank 20.

The non-common part 45 of the supply channel of the cold-water tank discharge 23 or the second cold-water tank discharge 25 to the tap 40 is, in the draw-off mode of water from the cold-water tank 20 to the tap 40, a line for conveying water with a temperature below 65° C. In order at least to disinfect this non-common part 45 of the supply channel, a return pipe 60 is provided, which makes it possible to form a circulation circuit. The circulation circuit connects the hot-water tank discharge 13 via the cold-water tank 20 and return pipe 60 back to the hot-water tank feed 12. The circulation circuit also comprises the non-common part 45 of the supply channel of the cold-water tank discharge 23 or the second cold-water tank discharge 25 to the tap 40.

Figure 3:
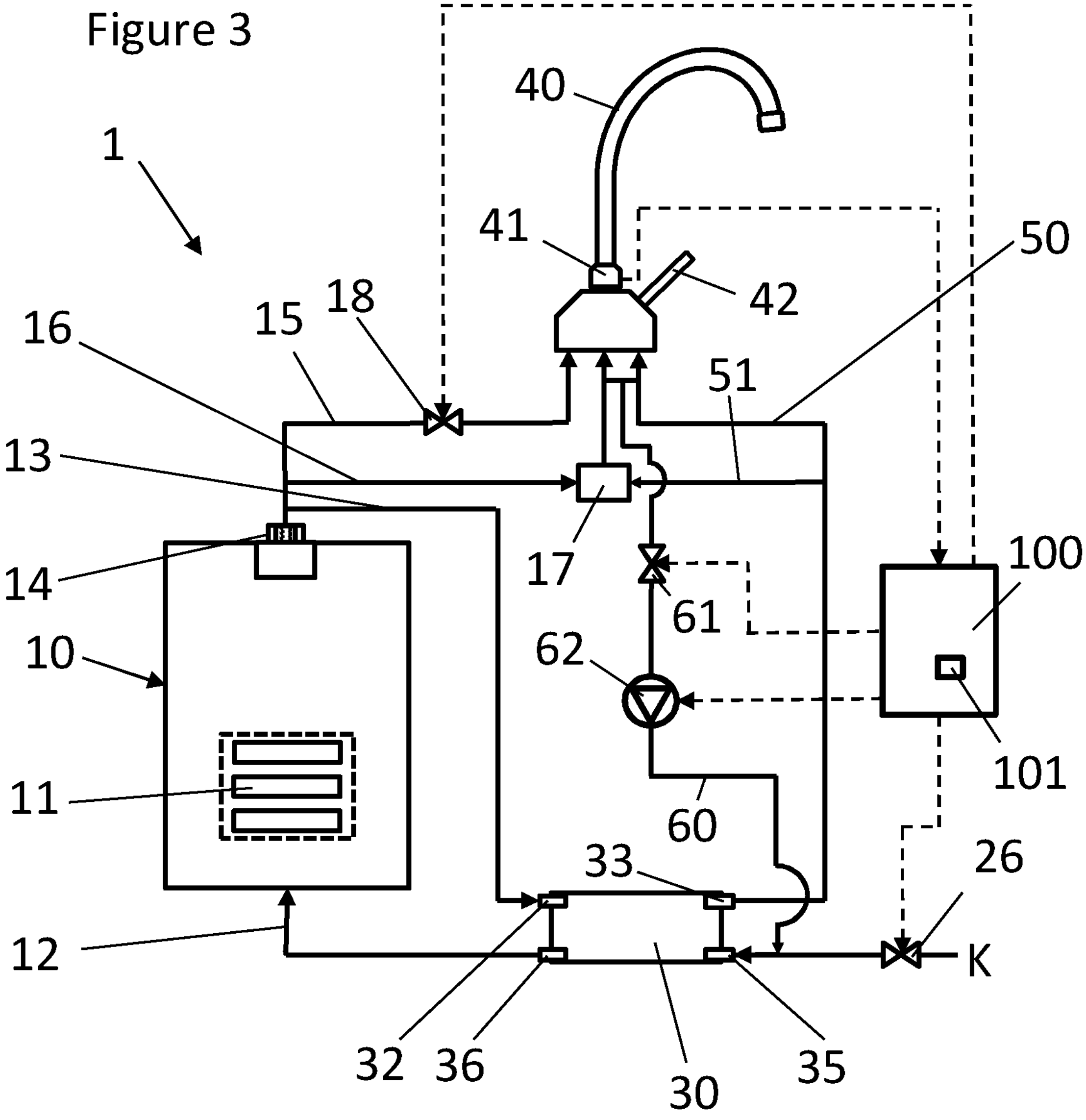
FIG. 3 shows schematically a second embodiment of a water supply device according to the invention.

It is also possible to connect return pipe 60 to the second inlet 35 of the heat exchanger, for example as shown in FIG. 3.

A return pipe valve 61 to be controlled by the control device 100 is fitted in the return pipe 60 to allow or to block flow of water through the return pipe 60. In addition, a pump 62 is fitted in the circulation circuit. In the embodiment shown, this is fitted in the return pipe 60, but it may also be placed at some other location in the circulation circuit. The pump 67 would also be usable for pumping water round through the circulation circuit, and may thus support or take over the function of the pump 62.

For effective disinfection of the non-common part 45 of the supply channel of the water supply device 1, for example on commissioning, the circulation circuit can be formed by blocking the inlet valve 26 and the draw-off valve 44 and opening the return pipe valve 61. By pumping water round through the circulation circuit, hot water from the hot-water tank 10 is fed into the line for conveying water with a temperature below 65° C. and returned to the hot-water tank 10 via the return pipe. Because no new fresh water is fed by the heat exchanger 30 to the hot-water tank 10, the hot water that flows from the hot-water tank 10 through the circulation circuit will undergo relatively little or no cooling down in the heat exchanger 30. As a result, the temperature of the water that is pumped round in the circulation circuit will remain above 65° C. for a considerable time and therefore ensure effective disinfection of the pipelines of the circulation circuit.

In order to prevent, during disinfection, on opening the tap 40 with control element 42, hot water being supplied from the hot-water tank 10 via the third hot-water tank discharge 16, a third outlet valve 18 to be controlled by the control device 100 may be provided in the third hot-water tank discharge 16 or a pipeline downstream thereof, which is closed while water is pumped round through the circulation circuit.

Figure 1A:
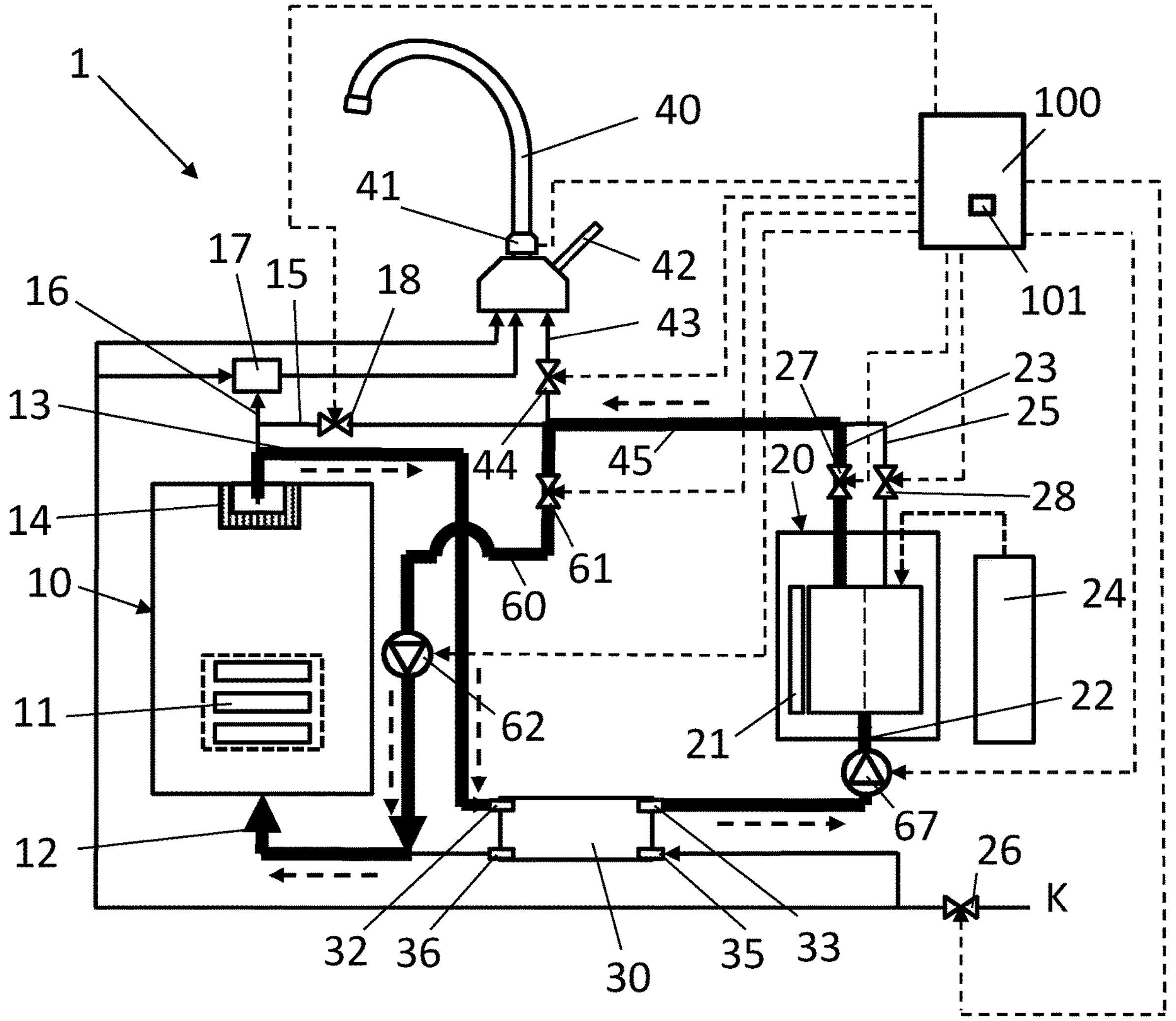
FIG. 1A shows the embodiment in FIG. 1 with the course of the circulation circuit.

FIG. 1A shows the route of the circulation circuit with thickened lines, the direction of flow being indicated by dashed arrows.

Once the disinfection is completed, the pumping round of water through the circulation circuit may be ended by stopping the pump 62 and/or pump 67. The return pipe valve 61 may then be closed again and the inlet valve 26 opened. During this disinfection, dispensing of water by the water supply device may be prevented. This has the advantage that there is no risk of burning with hot water or steam leaving the tap as a result of disinfection.

In an embodiment as for example shown in FIG. 3, the return pipe 60 may come out at the second heat exchanger inlet 35, so that hot water from the hot-water tank 10 during disinfection is cooled down more in the heat exchanger 30 by colder water derived from the cold-water tank 20, so as to reduce the thermal loading on components that may be less resistant or are not resistant to the temperature from the hot-water tank 10.

Advantageously, the whole non-common part 45 of the supply channel forms part of the circulation circuit, so that this part is disinfected completely during a sterilization cycle. The common part 43 will be flushed regularly with hot water that is supplied via the second hot-water tank discharge 15 and will be disinfected with this hot water.

It has been found that with this water supply device 1, sterile cooled and hot water can be dispensed for a longer time. If desired, the non-common part 45 of the supply channel and other parts of the circulation circuit may be disinfected periodically, for example once per week or per month, or after a certain period without using the water supply device 1, by allowing hot water to flow round through the circulation circuit, as described above.

By means of the control device 100, the water supply device 1, as described above, may be operated in at least three, for example five, operating modes:

- a stand-by mode, in which the first outlet valve 27 and the second outlet valve 28 are closed so that no cooled water is discharged from the cold-water tank 20; in this stand-by mode the inlet valve 26 and the return pipe valve 61 may be opened or closed; the third outlet valve 18 and draw-off valve 44 are also closed,
- a draw-off mode for cooled water, in which the first outlet valve 27 or the second outlet valve 28 and the draw-off valve 44 are opened for supplying cooled water or carbonated cooled water, wherein the inlet valve 26 is opened to allow inflow of fresh water into the hot-water tank 10 through the hot-water tank feed 12, and the return pipe valve 61 is closed; in the draw-off mode the control device 100 may activate the pump 67 to pump carbonated water,
- a sterilization mode, in which the return pipe valve 61 is placed in an open state and the first outlet valve 27 and/or the second outlet valve 28 is/are placed in an open state to form a circulation circuit; and wherein the inlet valve 26 is closed to block inflow of fresh water into the hot-water tank through the hot-water tank feed; the draw-off valve 44 and third outlet valve 18 are also closed; in this sterilization mode, as a result of pumping round by the pump 62 and/or pump 67 controlled by the control device 100, sterilization of the cold-water tank and of the associated pipelines is carried out, and
- a draw-off mode for hot or boiling water, in which hot water of at least 65° C., for example 108° C., can be supplied by means of the second hot-water tank discharge 15, the third outlet valve 18 and the draw-off valve 44 as hot or boiling water for consumption, and
- a draw-off mode for mixing water, in which water can be supplied with a temperature from the fresh tap water to hot water, by mixing fresh tap water with hot water from the hot-water tank 10 in the mixing valve 17 and wherein the desired temperature of the water supplied can be regulated by means of control element 42.

The control device 100 may be arranged to carry out a sterilization cycle in sterilization mode periodically, for example once per week or per month. In addition or as an alternative, the control device 100 may be arranged to carry out a sterilization cycle on request. For example, the control device 100 may be activated to carry out a sterilization cycle during commissioning or maintenance of the water supply device 1.

The control device 100 may be arranged for controlling further valves of the water supply device 1, such as the third outlet valve 18 for supplying boiling water via the second hot-water tank discharge 15.

FIG. 3 shows a second embodiment of a water supply device according to the invention. Components with the same reference numbers have the same function and will not be discussed separately here.

The water supply device 1 comprises a hot-water tank 10, a heat exchanger 30 and a tap 40.

The hot-water tank 10, the heat exchanger 30 and the tap 40 are configured substantially the same as the corresponding components of the water supply device 1 in FIG. 1.

A difference from the hot-water tank 10 in FIG. 1 is that the filter in FIG. 3 is fitted in the hot-water tank discharge 13 instead of in the tank itself. However, the filter may also be fitted in the hot-water tank 10.

Furthermore, the first outlet 33 of the first heat exchange line 31 of the heat exchanger 30 is connected via the pipeline 50 directly to the tap 40. The water that is cooled down in the heat exchanger 30 to for example 20° C. may then be supplied without further cooling down or optionally with a through-flow cooling device by the tap 40.

Another pipeline 51 which runs partly in common with pipeline 50 is connected to the mixing device 17 for conveying relatively cold water to the mixing device 17. In the mixing device 17, water cooled down in the first heat exchange line 31 of the heat exchanger 30 is mixed at a certain, preferably adjustable, mixing ratio with the hot water that is supplied via the third hot-water tank discharge 16 from the hot-water tank 10. The mixing ratio is usually set so that the water coming from the mixing device 17 is warm water.

A second mixing device, which can be operated by means of the control element 42, is provided in the tap 40. By operating the second mixing device, the water from the pipeline 50 and/or water coming from the mixing device 17 can be delivered in any desired mixing ratio. It is thus also possible to supply only water from pipeline 50 or only water from the mixing device 17. Instead of providing a second mixing device that is to be operated manually with the control element 42, valves may be provided, which are to be controlled by the control device 100, or are to be operated in some other way.

The pipelines 50 and 51 are arranged for conveying water that has cooled down in the heat exchanger 30 and are in consequence used as pipelines for conveying water with a temperature below 65° C. Advantageously, the water supply device 1 offers the possibility of sterilizing these pipelines.

According to the embodiment in FIG. 1, the water supply device in FIG. 3 comprises a return pipe 60 that makes it possible to form a circulation circuit. The circulation circuit connects the hot-water tank discharge 13 to the hot-water tank-supply 12, wherein the circulation circuit also comprises the largest parts of the pipelines 50 and 51.

Figure 3A:
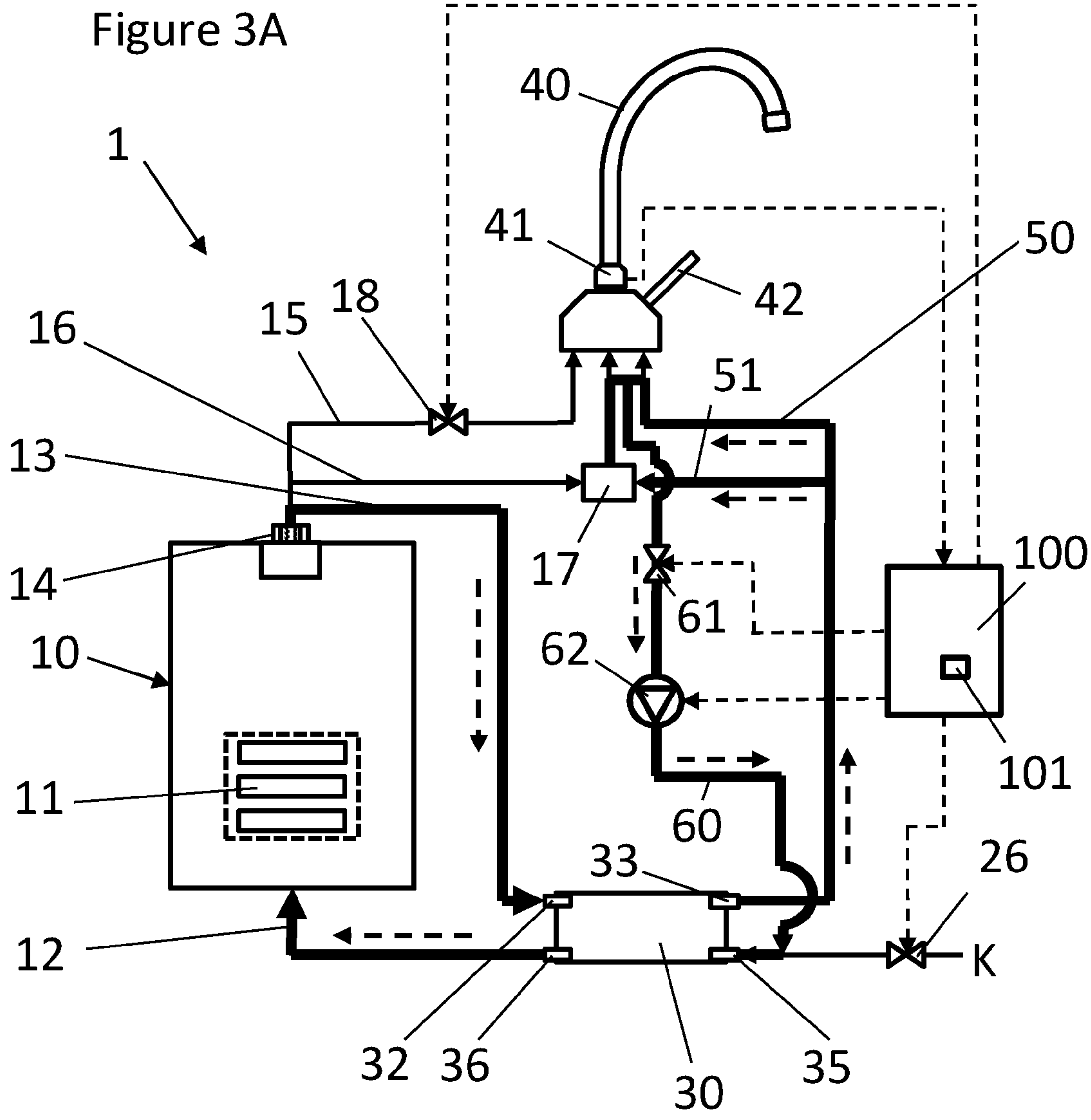
FIG. 3A shows the embodiment in FIG. 3 with the course of the circulation circuit.

FIG. 3A shows the route of the circulation circuit by means of thickened lines, wherein the direction of flow is indicated with dashed arrows. In the return pipe 60, a return pipe valve 61 is fitted to allow or to block flow of water through the return pipe 60, and a pump 62 for pumping water round through the circulation circuit. The return pipe valve 61 and the pump 62 are controllable by the control device 100.

To disinfect the pipelines 50 and 51, the circulation circuit can be formed by blocking the inlet valve 26 and opening the return pipe valve 61. The draw-off valve, which remains closed during this disinfection mode, is in this case formed by the second mixing device, operated mechanically with the control element 42. By pumping water round with pump 62 through the circulation circuit, the water in the pipelines 50 and 51 is kept above 65° C. with the hot water from the hot-water tank 10.

Consequently, the circulation circuit has two branches, through which hot water from the hot-water tank 10 flows simultaneously during the pumping round of water through the circulation circuit. In an alternative embodiment it is also possible to provide additional valves, which make it possible to form a circulation circuit for either pipeline 50 or pipeline 51. This can be done by placing valves in the non-common parts of the pipelines 50 and 51 or in non-common parts of the return pipe 60. Once this disinfection is completed, the pumping round of water through the circulation circuit can be ended by stopping the pump 62. The return pipe valve 61 can then be closed and the inlet valve 26 can be opened. These actions may be controlled from the control device 100.

It is possible to provide an additional draw-off valve (corresponding to draw-off valve 44 in FIG. 1) that is operated by the control device 100. By means of said additional draw-off valve, during disinfection it is possible to prevent water being supplied by the water supply device 1 when the second mixing device is opened by operating the control element 42. This has the advantage that there is no risk of burning with hot water or steam leaving the tap as a result of disinfection.

In FIG. 3 the return pipe is connected near the second inlet 35 of the heat exchanger. This returns the water from cold-water tank 20 to the hot-water tank 10 via the second heat exchange line 32 during sterilization. This connection has the advantage, compared to direct connection of return pipe 60 to the hot-water tank feed 12, that the water from the cold-water tank can provide extra cooling of the hotter water coming from the hot-water tank via the heat exchanger. It was found that this may be advantageous in connection with the thermal protection of certain components such as valves and seals.

An advantage of the water supply device in FIG. 3 is that all the water that is supplied by the tap 40, thus also the mixing water, has come from the hot-water tank 10, and consequently is suitable for consumption. This is particularly advantageous in a situation where the fresh water that comes from the water supply system K is not, at least not directly, suitable for consumption on account of the presence of bacteria or other contaminants in the fresh water. The water supply device 1 thus offers the possibility of supplying mixed warm and/or tepid water via the second mixing device (not shown) by means of control element 42 and boiling water via the second hot-water tank discharge 15 by means of control element 41 and the third outlet valve 18.

Precisely because the water supply device 1 is suitable for a situation where the fresh water that comes from the water supply system K is not directly suitable for consumption, it is advantageous that the control device 100 is arranged for controlling a sterilization mode, in which a circulation circuit is formed and a pump is activated to pump hot water round through the circulation circuit.

The invention claimed is:

1. A water supply device for supplying water for consumption, comprising a hot-water tank arranged for keeping hot water at a temperature of at least 90° C., comprising:

a hot-water tank feed for supplying fresh water to the hot-water tank, a hot-water tank discharge for discharging hot water from the hot-water tank, a pipeline for conveying, in a draw-off mode of the water supply device, water with a temperature below 65° C. to a draw-off point, wherein the line for conveying water with a temperature below 65° C. is in fluid communication with the hot-water tank discharge, and wherein the water with a temperature below 65° C. to be supplied in the draw-off mode comes at least partially from the hot-water tank, wherein the water supply device comprises:

an inlet valve that is arranged to allow or to block inflow of fresh water into the hot-water tank feed, a return pipe that connects the line for conveying water with a temperature below 65° C. to the hot-water tank for returning water from the line for conveying water with a temperature below 65° C. to the hot-water tank, and a return pipe valve fitted in the return pipe to allow or to block flow of water through the return pipe, in such a way that by blocking the inlet valve and opening the return pipe valve, a circulation circuit is formed, wherein a pump is provided in the circulation circuit for pumping water in such a way that water that is supplied from the hot-water tank into the line for conveying water with a temperature below 65° C. is returned via the return pipe to the hot-water tank for the at least partial sterilization of the line for conveying water with a temperature below 65° C.

2. The water supply device according to claim 1, wherein the water supply device comprises a cooling device for cooling the hot water from the hot-water tank to water with a temperature below 65° C.

3. The water supply device according to claim 1, wherein the water supply device comprises a mixing device for mixing the hot water from the hot-water tank with cold water to provide water with a temperature below 65° C.

4. The water supply device according to claim 1, wherein the water supply device comprises:

a cold-water tank arranged for keeping cooled water at a temperature of at most 20° C., comprising:

a cold-water tank feed connected to the hot-water tank discharge for supplying water from the hot-water tank to the cold-water tank, and a cold-water tank discharge for supplying cooled water from the cold-water tank into the pipeline for conveying water with a temperature below 65° C.

5. The water supply device according to claim 4, wherein the cold-water tank comprises a first compartment for keeping cooled water at a temperature of at most 20° C. and a second compartment arranged for keeping cooled carbonated water at a temperature of at most 20° C., wherein the first compartment is connected to the cold-water tank feed and the cold-water tank discharge, wherein the second compartment is connected to a second cold-water tank feed and a second cold-water tank discharge, wherein the second cold-water tank feed is connected to the hot-water tank discharge for supplying water from the hot-water tank to the second compartment, and the second cold-water tank discharge is provided for supplying cooled carbonated water from the second compartment via a further line, and wherein the water supply device further comprises a $CO_2$ holder for supplying $CO_2$, wherein the second compartment is arranged for dissolving $CO_2$ provided by the $CO_2$ holder in the cooled water held in the second compartment.

6. The water supply device according to claim 5, wherein the second compartment is fitted at least partially in or around the first compartment.

7. The water supply device according to claim 1, wherein the water supply device comprises:

a heat exchanger comprising:

a first heat exchange line with a first inlet and a first outlet, and a second heat exchange line with a second inlet and a second outlet, wherein the first heat exchange line and the second heat exchange line are arranged to exchange heat with each other, and wherein the first inlet is connected to the hot-water tank discharge and the first outlet is connected to the pipeline for supplying, at least in the draw-off mode, water with a temperature below 65° C., and wherein the second inlet is to be connected to a fresh water main and the second outlet is connected to the hot-water tank feed.

8. The water supply device according to claim 1, wherein the water supply device comprises control device for controlling at least the inlet valve, the return pipe valve and the pump, wherein the control device is arranged for operating the water supply device in various operating modes, wherein the operating modes comprise a sterilization mode, in which:

the inlet valve is placed in a closed state, the return pipe valve is placed in an open state and the pump is activated, in such a way that water is pumped through the circulation circuit for the at least partial sterilization of the pipeline for conveying water with a temperature below 65° C.

9. The water supply device according to claim 8, wherein the water supply device comprises a draw-off valve to be controlled by the control device that is arranged to allow or to block outflow of water with a temperature below 65° C. from the pipeline for conveying water with a temperature below 65° C. to the draw-off point, wherein in the sterilization mode the draw-off valve is placed in a closed state to block outflow of water with a temperature below 65° C. from the line for conveying water with a temperature below 65° C. to the draw-off point.

10. The water supply device according to claim 9, wherein the operating modes to be controlled by the control device further comprise:

a stand-by mode, in which the draw-off valve and the return pipe valve are placed in a closed state, and the draw-off mode, in which the return pipe valve is placed in a closed state and the draw-off valve is placed in an open state to allow outflow of water with a temperature below 65° C. from the pipeline for conveying water with a temperature below 65° C. to the draw-off point and in which the inlet valve is placed in an open state to allow inflow of fresh water into the hot-water tank through the hot-water tank feed.

11. The water supply device according to claim 8, wherein the control device is arranged to carry out the sterilization mode periodically and/or on request.

12. The water supply device according to claim 1, wherein the pipeline for conveying water with a temperature below 65° C. is connected to a tap to be supplied as water for consumption.

13. The water supply device according to claim 1, wherein the hot-water tank comprises a second hot-water tank discharge for supplying hot or boiling water, wherein the water supply device comprises a second draw-off valve that is arranged to allow or to block outflow of hot water from the second hot-water tank discharge, and wherein the control device is further arranged for controlling a draw-off mode for hot or boiling water, in which the second draw-off valve is placed in an open state to allow outflow of hot water from the hot-water tank through the second hot-water tank discharge and in which the inlet valve is placed in an open state to allow inflow of fresh water into the hot-water tank through the hot-water tank feed.

14. The water supply device according to claim 1, wherein the water supply device comprises a filter for filtering the hot water, wherein the filter is fitted in the hot-water tank, in the hot-water tank discharge or in the hot-water tank feed, in such a way that the hot water discharged by the hot-water tank discharge is filtered by the filter.

15. A method for sterilizing a pipeline that is used in a draw-off mode for conveying water with a temperature below 65° C. to a draw-off point and that is in fluid communication with a hot-water tank discharge of a hot-water tank of a water supply device, wherein the hot-water tank is arranged for keeping hot water at a temperature of at least 90° C. and comprises a hot-water tank feed for supplying fresh water to the hot-water tank, wherein the water with a temperature below 65° C. to be supplied in the draw-off mode comes at least partially from the hot-water tank, wherein an inlet valve is provided that is arranged to allow or to block inflow of fresh water into the hot-water tank, and a draw-off valve that is arranged to allow or to block outflow of water with a temperature below 65° C. from the line for conveying water with a temperature below 65° C. to the draw-off point, wherein a return pipe is provided, which connects the pipeline for conveying water with a temperature below 65° C. to the hot-water tank for returning water from the line for conveying water with a temperature below 65° C. to the hot-water tank, wherein a return pipe valve is fitted in the return pipe to allow or to block flow of water through the return pipe, and wherein a pump is provided for at least pumping water through the return pipe, wherein the method comprises the at least partial sterilization of the pipeline for conveying water with a temperature below 65° C., comprising the steps forming a circulation circuit by blocking the inlet valve and opening the return pipe valve, and pumping water round in the circulation circuit, wherein water that is supplied from the hot-water tank into the pipeline for conveying water with a temperature below 65° C. is returned via the return pipe to the hot-water tank.

16. The method according to claim 15, wherein the water with a temperature below 65° C. to be supplied in the draw-off mode is hot water from the hot-water tank that is cooled down to water with a temperature below 65° C.

17. The method according to claim 15, wherein the water with a temperature below 65° C. to be supplied in the draw-off mode is hot water from the hot-water tank mixed with cold water to water with a temperature below 65° C.

18. The method according to claim 17, wherein the water supply device comprises control device for controlling at least the inlet valve, the return pipe valve and the pump, wherein the method comprises controlling the water supply device with the control device in various operating modes, wherein the operating modes comprise:

a sterilization mode, in which the inlet valve and the draw-off valve are placed in a closed state, the return pipe valve is placed in an open state and the pump is activated to allow flow of water through the return pipe, in such a way that water is pumped through the circulation circuit for the at least partial sterilization of the pipeline for conveying water with a temperature below 65° C., and wherein the method comprises selecting the sterilization mode for the control device.

19. The method according to claim 18, wherein the operating modes to be controlled by the control device further comprise:

a stand-by mode, in which the draw-off valve and the return pipe valve are placed in a closed state, and a draw-off mode, in which the return pipe valve is placed in a closed state and the draw-off valve is placed in an open state to allow outflow of water with a temperature below 65° C. from the pipeline for conveying water with a temperature below 65° C. to the draw-off point and in which the inlet valve is placed in an open state to allow inflow of fresh water into the hot-water tank through the hot-water tank feed.

20. The method according to claim 15, wherein the water supply device comprises:

a heat exchanger comprising:

a first heat exchange line with a first inlet and a first outlet, and a second heat exchange line with a second inlet and a second outlet, wherein the first heat exchange line and the second heat exchange line are arranged to exchange heat with each other, wherein the first inlet is connected to the hot-water tank discharge and the first outlet is connected to the pipeline for conveying water with a temperature below 65° C., and wherein the second inlet is connected to a fresh water main and the second outlet is connected to the hot-water tank feed, wherein the method comprises supplying hot water from the hot-water tank via the first heat exchange line to the pipeline for conveying water with a temperature below 65° C.

21. The method according to claim 20, wherein the pipeline for conveying water with a temperature below 65° C. is connected to a tap in order to be supplied as cooled-down water for consumption.

22. The method according to claim 15, wherein the water supply device comprises:

a cold-water tank arranged for keeping cooled water at a temperature of at most 20° C., comprising:

a cold-water tank feed for supplying water to the cold-water tank, a cold-water tank discharge for supplying cooled water from the cold-water tank, a heat exchanger comprising:

a first heat exchange line with a first inlet and a first outlet, and a second heat exchange line with a second inlet and a second outlet, wherein the first heat exchange line and the second heat exchange line are arranged to exchange heat with each other, wherein the first inlet is connected to the hot-water tank discharge and the first outlet is connected to the cold-water tank feed, and wherein the second inlet is to be connected to a fresh water main and the second outlet is connected to the hot-water tank feed, and wherein the method comprises supplying, during the draw-off mode, the hot water from the hot-water tank via the first heat exchange line to the cold-water tank, then to be supplied as cooled-down water for consumption.

23. The method according to claim 22, wherein the cold-water tank comprises a first compartment for keeping cooled water at a temperature of at most 20° C. and a second compartment arranged for keeping cooled carbonated water at a temperature of at most 20° C., wherein the first compartment is connected to the cold-water tank feed and the cold-water tank discharge, wherein the second compartment is connected to a second cold-water tank feed and a second cold-water tank discharge, wherein the second cold-water tank feed is connected to the hot-water tank discharge for supplying water from the hot-water tank to the second compartment, and the second cold-water tank discharge is provided for supplying cooled carbonated water from the second compartment via a further line, wherein the water supply device further comprises a $CO_2$ holder for supplying $CO_2$, wherein the second compartment is arranged for dissolving $CO_2$ provided by the $CO_2$ holder in the cooled water held in the second compartment, and wherein the method comprises supplying, during the draw-off mode, the hot water from the hot-water tank via the first heat exchange line to the second compartment, then to be supplied as cooled carbonated water.

* * * * *